(12) United States Patent  
Forsberg et al.

(10) Patent No.: US 7,546,035 B2  
(45) Date of Patent: Jun. 9, 2009

(54) METHOD FOR CONVEYING MANAGEMENT INFORMATION

(75) Inventors: Gunnar Forsberg, Stockholm (SE); Johan Sandell, Stockholm (SE)

(73) Assignee: Transmode Systems AB, Hagersten (SE)

( * ) Notice: Subject to any disclaimer, the term of this patent is extended or adjusted under 35 U.S.C. 154(b) by 498 days.

(21) Appl. No.: 10/557,022

(22) PCT Filed: May 11, 2004

(86) PCT No.: PCT/SE2004/000717

§ 371 (c)(1),  
(2), (4) Date: Nov. 16, 2005

(87) PCT Pub. No.: WO2004/107627

PCT Pub. Date: Dec. 9, 2004

(65) Prior Publication Data

US 2007/0077065 A1  Apr. 5, 2007

(30) Foreign Application Priority Data

May 28, 2003  (SE) .................................... 0301578

(51) Int. Cl.  
*H04B 10/08*  (2006.01)

(52) U.S. Cl. ............................. 398/30; 398/31; 398/33

(58) Field of Classification Search ............ 398/30–33, 398/163, 166  
See application file for complete search history.

(56) References Cited

U.S. PATENT DOCUMENTS

| 5,019,769 | A | 5/1991 | Levinson |
| 7,010,233 | B2 * | 3/2006 | Lindblad .................... 398/164 |
| 7,090,509 | B1 | 8/2006 | Gilliland et al. ............ 439/76.1 |
| 2003/0039024 | A1 * | 2/2003 | Clayton et al. .............. 359/326 |
| 2003/0043437 | A1 | 3/2003 | Stough et al. |

FOREIGN PATENT DOCUMENTS

| EP | 0 548 111 B1 | 9/1997 |
| JP | 62-107544 | 5/1987 |
| JP | 05-130058 | 5/1993 |
| JP | 05-344134 | 12/1993 |
| JP | 06-097885 | 4/1994 |
| JP | 09-247104 | 9/1997 |
| JP | 11-355216 | 12/1999 |
| JP | 2000-295296 | 10/2000 |

\* cited by examiner

*Primary Examiner*—Dalzid Singh  
(74) *Attorney, Agent, or Firm*—Bringham McCutchen LLP

(57) ABSTRACT

The invention relates to a method for conveying management information in a WDM system from a number of wavelength converters to a central management unit, wherein a management information signal is superimposed on the WDM signal from the respective wavelength converter. A fraction of the optical signal in the common optical transmission line is tapped off to a detector and the different management information signals are recovered by a receiver unit which is connected to the detector. The invention also relates to a WDM system and a pluggable WDM wavelength converter.

21 Claims, 3 Drawing Sheets

METHOD FOR CONVEYING MANAGEMENT INFORMATION

FIELD OF THE INVENTION AND PRIOR ART

The present invention relates to a method for conveying management information in a WDM system from a number of wavelength converters to a central management unit, wherein a management information signal is superimposed on the WDM signal from the respective wavelength converter. The invention also relates to a WDM system comprising a number of wavelength converters adapted to send WDM signals with management information signals superimposed thereon and means for combining the WDM signals from the wavelength converters and the associated management information signals for further transmission as a common optical signal on an optical transmission line. The invention also relates to a pluggable WDM wavelength converter for converting an electrical or optical signal into a WDM signal.

This invention relates to the optical WDM (Wavelength Division Multiplexing) technique for transmission of different data streams on a common optical line in the form of an optical fiber. The invention is applicable to any kind of optical WDM system, i.e. to CWDM (Coarse Wavelength Division Multiplexing) systems as well as DWDM (Dense Wavelength Division Multiplexing) systems.

In this description and the subsequent claims, the term "management information" refers to information about what is happening at or inside a wavelength converter, e.g. information about operating conditions such as optical input power level, optical output power level, signal quality, temperature, supply voltage, power consumption etc. The management information could also include an identification of the wavelength converter from which the management information is sent and alarm signals etc. The management information can be used for supervision and management of a WDM system and its wavelength converters.

In a WDM system data streams from different source units, e.g. from different subscriber or client appliances, are transmitted on different channels, where each channel has a separate wavelength on which the data stream is transmitted. An electrical or optical output signal from a source unit is converted to a WDM signal, i.e. an optical signal of a specific wavelength, by means of a wavelength converter. Such a wavelength converter is normally constituted by a so-called transceiver or transponder. The WDM signals from the different wavelength converters are combined for further transmission as a common optical signal on an optical transmission line, e.g. in the form of an optical fiber. The means for combining the WDM signals into a common optical signal could e.g. comprise a multiplexer, a multiplexer/demultiplexer or an add/drop filter or any combination of two or more such devices.

Pluggable WDM wavelength converters are commercially available in the form of GBIC transceivers (GBIC=Gigabit Interface Converter) and SFP transceivers (SFP=Small Form-factor Pluggable). The GBIC specification and the SFP specification, respectively, defines the electronic, electrical and physical interface of a removable transceiver module designed to operate at Gigabit speeds. The GBIC and SFP transceivers have an electrical I2C interface intended for transmission of management information.

An example of a WDM system provided with wavelength converters in the form of conventional transceivers, e.g. in the form of pluggable transceivers of the GBIC or SFP type, is illustrated in FIG. 1. In the illustrated system, electrical output signals from appliances A and B are converted to WDM signals by a number of transceivers 1 and combined by a multiplexer/demultiplexer 2 into a common optical signal for transmission on a common optical line 3a. Another multiplexer/demultiplexer 4 receives the common optical signal and converts this common optical signal into WDM signals of different wavelengths corresponding to the WDM signals sent by the transceivers 1 of the appliances A and B. The respective WDM signal is then conveyed to a transceiver 1 of appliance C, where the optical WDM signal in converted to an electrical or optical signal of a type that can be processed by the appliance C. Data streams are transmitted in the corresponding manner via the common optical line 3b from the appliance C to the appliances A and B. Management information generated by the transceivers 1 of the respective appliance is via an I2C interface of the transceivers transmitted to a local management unit 5 of the appliance, which collects the management information from all the transceivers 1 of the appliance in question. The local management unit 5 then sends the collected management information via a communication network, e.g. Internet, to a central management unit 6, where the management information from each appliance is collected and evaluated. With this manner of conveying management information, a problem will ensue when the different appliances A, B and C are from different manufacturers. It is normally difficult and expensive to integrate management information originating from different appliances not manufactured by one and the same company. Even though the transceivers 1 are standardized in their I2C interfaces, problem would ensue due to the fact that appliances from different manufacturers normally have different types of local management units.

An alternative solution for conveying management information in a WDM system is to use the optical interface of the wavelength converters. This solution is called in-band transmission of management information, since the management information is conveyed in the same optical signal as the main data from the respective wavelength converter. There are two main methods of optically conveying management information from a wavelength converter. According to a first method, the protocol of the digital information transmitted from the wavelength converter has to be known, some bit slots or bytes that are available for this purpose being used for conveying the management information. This method is a typical point-to-point method and can not be used for conveying management information from several wavelength converters to a central management unit, as the management information only can be conveyed from a wavelength converter in a first appliance to the corresponding wavelength converter in a second appliance. According to a second method, a narrow band data channel for conveying the management information is superimposed on the main high bitrate data signal from the wavelength converter, i.e. the management information is superimposed on the main data signal from the wavelength converter.

The above-mentioned second method is normally only used for point-to-point transmission of management information. It has however been suggested to use this method for conveying management information from several wavelength converters to a central point. According to this suggested application, which is schematically illustrated in FIG. 2, a management information signal is superimposed on the main data signal from the respective wavelength converter, i.e. each separate wavelength $\lambda_1, \lambda_2, \ldots \lambda_N$ in the common optical line 3 is associated with a separate management information signal. A small fraction of the respective wavelength $\lambda_1, \lambda_2, \ldots \lambda_N$ in the common optical line 7 is tapped off by wavelength selective filtering means $8_1, 8_2, \ldots 8_N$ to a receiver $9_1, 9_2, \ldots 9_N$ designed to detect the superimposed management information signal associated with the wavelength in question. The receivers are connected to a central management unit 6. The filtering means could be constituted by a device, such as a demultiplexer, capable of separating the different wavelengths in the common optical line or one separate wavelength selective filter for each wavelength. This solution requires expensive filtering means and a large number of receivers. According to a similar method, developed by the company PROXIMION FIBER OPTICS, a tunable tap that can tap a fraction of the power of one wavelength at a time in the common optical line is used. This solution is very expensive and only works in a limited wavelength range only suitable for DWDM systems.

In this description and the subsequent claims, the optical main high bitrate data signal generated by and transmitted from a wavelength converter is referred to as a WDM signal.

In this description and the subsequent claims, a pluggable wavelength converter refers to as a wavelength converter in the form of a module which is removably attachable to a source unit.

OBJECT OF THE INVENTION

The object of the present invention is to provide a simple and cost-effective solution for conveying management information in a WDM system from a number of wavelength converters to a central management unit.

SUMMARY OF THE INVENTION

Said object is achieved by means of a method according to claim 1. The method according to the invention is characterized in:
that the management information signals of the different wavelength converters are superimposed on the respective WDM signal in a mutually distinguishable manner;
that the WDM signals from the wavelength converters and the associated management information signals are combined and transmitted as a common optical signal on an optical transmission line;
that a fraction of the common optical signal is tapped off and directed to a detector, which converts the received fraction of the common optical signal into an electrical signal;
that the electrical signal from the detector is directed to a receiver unit, which recovers the different management information signals from the received electrical signal; and
that the recovered management information signals are transmitted from the receiver unit to the central management unit. The solution according to the invention is possible to implement by means of low cost components.

According to a preferred embodiment of the invention, the wavelength converters send the management information signals repeatedly. According to this embodiment, the management information is sent in the same manner as Text TV data, with information flowing in one direction only. When the management information has been sent from a wavelength converter, the transmission procedure is started again and repeated endlessly.

According to another preferred embodiment of the invention, the management information signals of the different wavelength converters are modulated onto carriers of mutually different carrier frequencies, each wavelength converter, i.e. each wavelength in the common optical signal, being associated with a specific carrier frequency. Hereby, it will be possible, in an efficient and simple manner, to superimpose the management information signals of the different wavelength converters on the respective WDM signal in a mutually distinguishable manner.

According to another preferred embodiment of the invention, the frequency range for the carriers is located above 1 GHz, preferably in the range of 2.3-2.7 GHz. Most of the high speed protocols have a maximum spectral content at low frequencies, where the spectral content looks like white noise. It is therefore favourable to locate the frequency range of the carriers at high frequencies above 1 GHz. Practically all the presently available fiber optic protocols use NRZ modulation, implying that the symbol "1" is sent as a constant optical level in 100% of the bit slots and the symbol "0" is sent as a much lower level in 100% of the bit slots. NRZ signals have a zero in the spectral content exactly at the frequency corresponding to the bitrate (baudrate) and in the frequencies corresponding to integer multiples of the bitrate. The most frequently used protocols today are GbE and SDH/Sonet. All these protocols have spectral zero intensity at either 2.48823 GHz or 2.500 GHz. Therefore, a very good frequency band for the carriers of the management information signals would be approximately 2.3-2.7 GHz.

According to another preferred embodiment of the invention, the respective management information signal is superimposed on the associated WDM signal by Frequency Division Multiplexing. This is a very favourable technique for superimposing the management information signals on the associated WDM signals.

According to another preferred embodiment of the invention, the frequency range in the respective WDM signal corresponding to the frequency range of the associated management information carrier is blocked or attenuated before the management information carrier is superimposed thereon. This improves the signal-to-noise ratio of the respective management information channel at the receiver unit.

According to another preferred embodiment of the invention, the WDM signals and the associated management information signals are generated in and sent from wavelength converters of pluggable type. Hereby, the generation of the management information and the transmission thereof from the wavelength converters may be controlled independently of the brand of the source units, which gives a very flexible solution.

Further preferred embodiments of the method according to the invention will appear from the subsequent description.

The invention also relates to a WDM system according to claim 8. Preferred embodiments of the WDM system according to the invention will appear from the dependent claims and the subsequent description.

The invention also relates to a pluggable WDM wavelength converter according to claim 19 for converting an electrical or optical signal into a WDM signal, which pluggable wavelength converter comprises a modulator for modulating a management information signal onto a carrier and means for superimposing the modulated carrier on the WDM signal. Preferred embodiments of the pluggable WDM wavelength converter according to the invention will appear from the dependent claims and the subsequent description.

BRIEF DESCRIPTION OF THE DRAWING

The invention will in the following be more closely described by means of embodiment examples, with reference to the appended drawing, where.

DETAILED DESCRIPTION OF PREFERRED EMBODIMENTS OF THE INVENTION

Figure 1:
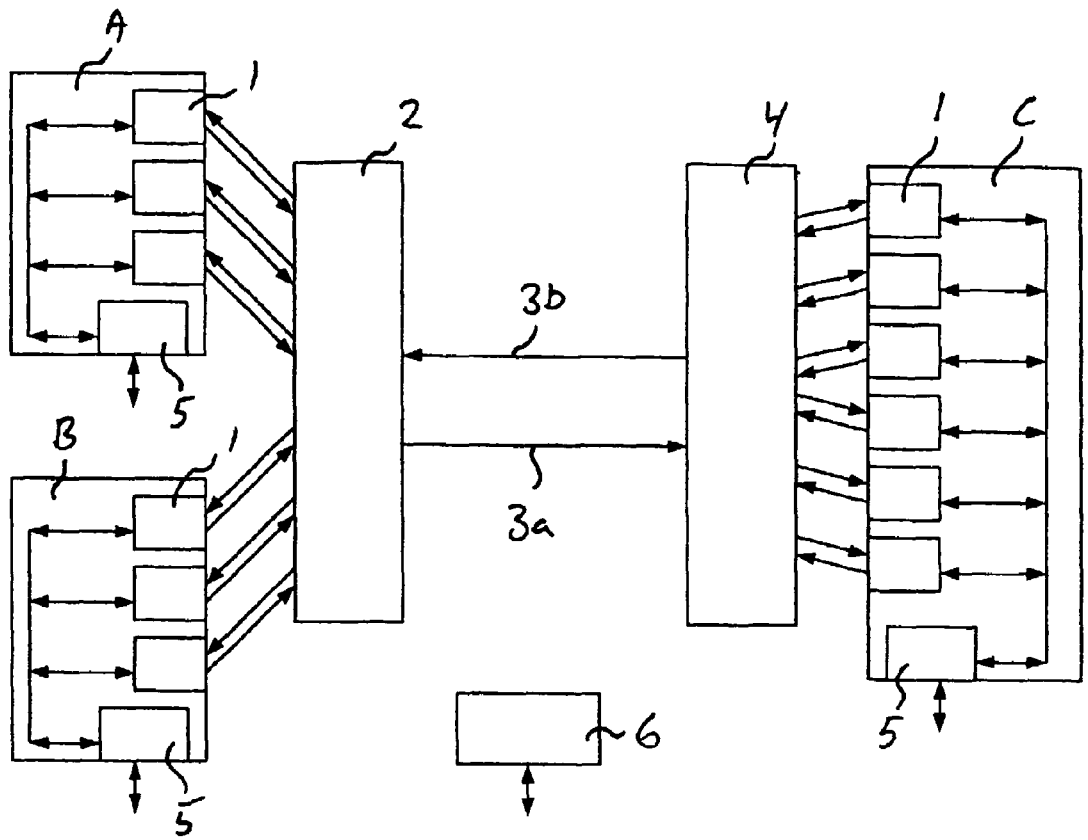
FIG. 1 is a block diagram illustrating a WDM system according to prior art.
Figure 2:
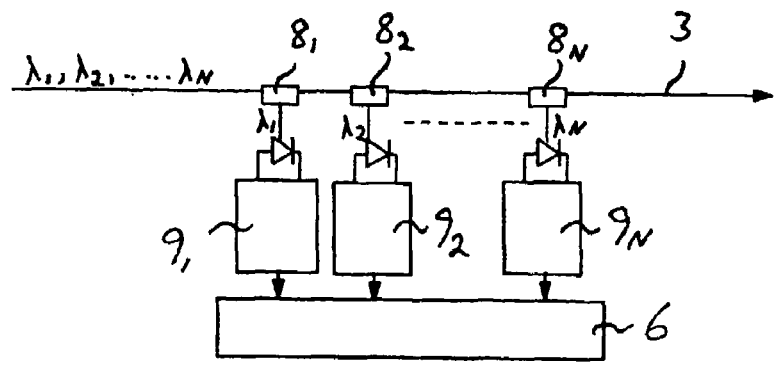
FIG. 2 is a schematical illustration of a method for in-band transmission of management information according to prior art.
Figure 3:
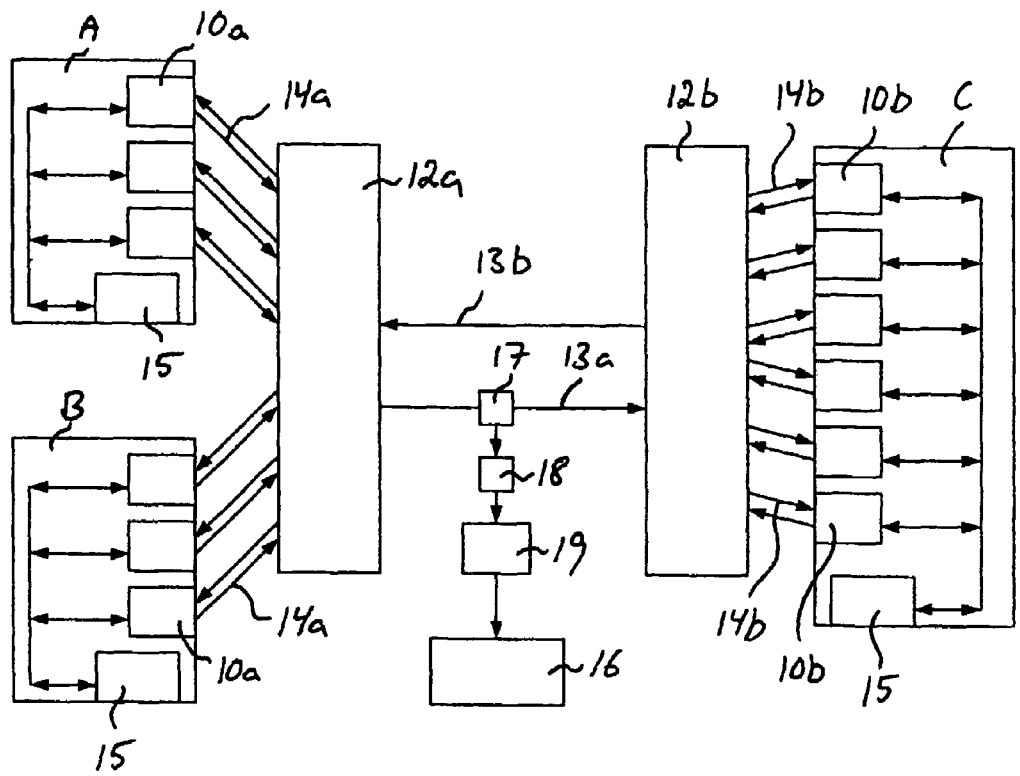
FIG. 3 is a block diagram illustrating a WDM system according to the present invention.

A WDM system according to the present invention is schematically illustrated in FIG. 3. The system comprises a number of wavelength converters 10a adapted to generate and send WDM signals with management information signals superimposed thereon and means 12a, e.g. in the form of a multiplexer or a multiplexer/demultiplexer or an add/drop filter, for combining the WDM signals from the wavelength converters 10a and the associated management information signals for further transmission as a common optical signal on an optical transmission line 13a, e.g. in the form of an optical fiber.

In the illustrated embodiment, wavelength converters 10a of two different appliances A, B are adapted to send WDM signals to a corresponding wavelength converter 10b of a third appliance C. Electrical or optical output signals from the appliances A, B are converted to WDM signals by the associated wavelength converters 10a. From the respective wavelength converter 10a, the WDM signal is transmitted to the combining means 12a via an optical line 14a, e.g. in the form of an optical fiber. The common optical signal sent from the combining means 12a is received by a demultiplexing means 12b, e.g. in the form of a demultiplexer or a multiplexer/demultiplexer, which is adapted to split up the common optical signal into the separate WDM signals. The respective WDM signal is then transmitted via an optical line 14b, e.g. in the form of an optical fiber, to a wavelength converter 10b of the above-mentioned third appliance C. Each wavelength converter 10a in an appliance A, B on a first side of the optical line 13a are adapted to communicate with a corresponding wavelength converter 10b in an appliance C on the other side of the optical line 13a. The number of appliances A, B, C and wavelength converters 10a, 10b on the respective side of the optical line 13a may of course vary from case to case.

The different wavelength converters 10a are adapted to superimpose the management information signals on the respective WDM signal in a mutually distinguishable manner, i.e. in such a manner that it subsequently will be possible to recover the individual management information signals from the common optical signal in the optical line 13a. The management information signals of the different wavelength converters 10a are preferably modulated onto sinusoidal carriers of mutually different carrier frequencies, whereupon the respective modulated carrier is superimposed on the WDM signal of the associated wavelength converter. The management information signals of the different wavelength converters 10a are thereby allocated mutually different carrier frequencies, each wavelength converter 10a being associated with a specific carrier frequency, i.e. each optical wavelength $\lambda_1, \lambda_2, \ldots \lambda_N$ of the optical signal in the common optical transmission line 13a is associated with a carrier of a specific carrier frequency. The respective management information signal is suitably superimposed on the associated WDM signal by Frequency Division Multiplexing. The frequency range for the carriers should be located where the noise from the WDM signals is low, suitably above 1 GHz and preferably in the range of 2.3-2.7 GHz. The respective wavelength converter 10a is preferably provided with means, e.g. in the form of a notch filter, for blocking or attenuating the frequency range in the WDM signal corresponding to the frequency range of the associated carrier.

In general, it is only of interest to receive management information from the wavelength converters and not to send information in return to them. Consequently, it is normally sufficient to provide only a one-way communication channel for management information. The management information may be sent in the same manner as Text TV, i.e. with the information flowing repeatedly in only one direction. In this case, the wavelength converters are adapted to send the management information signals repeatedly.

The management information only needs a narrow bandwidth since the number of bits to send is rather small. A typical bitrate of a few kbit/s or even lower would normally be enough. Consequently, a bandwidth of a few kHz, e.g. 1-10 kHz, would normally suffice. Around each of the above-mentioned carrier frequencies, a frequency band of a few kHz is used for modulating the management information onto the respective carrier. Digital amplitude modulation, such as ASK (Amplitude Shift Keying) modulation, or digital frequency modulation, such as FSK (Frequency Shift Keying) modulation, is suitably used as the modulation method for modulating the management information onto the respective carrier.

Figures 4, 5:
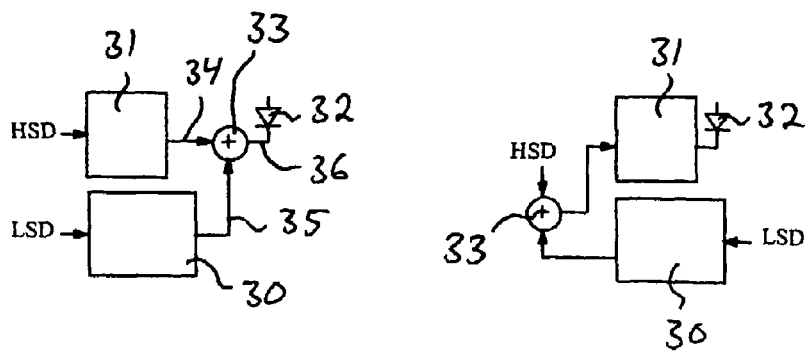
FIG. 4 is a block diagram illustrating a first method of superimposing a management information signal on a WDM signal of a wavelength converter.
FIG. 5 is a block diagram illustrating a second method of superimposing a management information signal on a WDM signal of a wavelength converter.

Two different ways of superimposing a management information signal on the WDM signal of a wavelength converter are illustrated in FIGS. 4 and 5. According to the solution illustrated in FIG. 4, a narrow band modulator 30 is adapted to receive low speed data (denoted LSD in FIGS. 4 and 5) comprising the management information, whereas a laser drive circuit 31 is adapted to receive the main high speed data (denoted HSD in FIGS. 4 and 5) to be sent from the wavelength converter. A narrow band signal from the modulator 30 is added to the drive signal from the laser drive circuit 31, and the combined signal is supplied as a drive signal to the laser 32 of the wavelength converter. If the outputs from the modulator 30 and the laser drive circuit 31 are electrical current signals, the adding member 33 could be constituted by a simple connection member for the electrical lines 34, 35, 36. According to the solution illustrated in FIG. 5, the signal from the modulator 30 comprising the management information is added to the high speed data before the connection to the laser drive circuit 31. Another alternative could be to have the laser emit light of a constant power and provide the required modulation of the optical signal from the laser by means of an external modulator. It is emphasized that the wavelength converters in the system according to the invention could be provided with any suitable type of light source, i.e. not necessarily a laser.

A tapping member 17 is provided for tapping a fraction, e.g. 1-5%, of the common optical signal that is transmitted in the common optical transmission line 13a. Since a fraction of the entire optical signal in the common optical transmission line 13a is tapped off, this fraction comprises all the wavelengths $\lambda_1, \lambda_2, \ldots \lambda_N$ of the common optical signal in the optical transmission line 13a and thereby a fraction of the superimposed management information from all the wavelength converters 10a. The tapping member 17 may be arranged in the common optical transmission line 13a between the combining means 12a and the demultiplexing means 12b, as illustrated in FIG. 3, or in the combining means 12a or the demultiplexing means 12b.

A detector 18, e.g. in the form of a photodiode, is connected to the tapping member 17 for converting said fraction of the common optical signal into an electrical signal. This electrical signal is then directed to a receiver unit 19, which is connected to the detector 18 for recovering the different management information signals from the electrical signal of the detector. The management information signals recovered by the receiver unit 19 are transmitted to a central management unit 16, which is connected to the receiver unit 19 for receiving and processing the management information signals.

Figure 6:
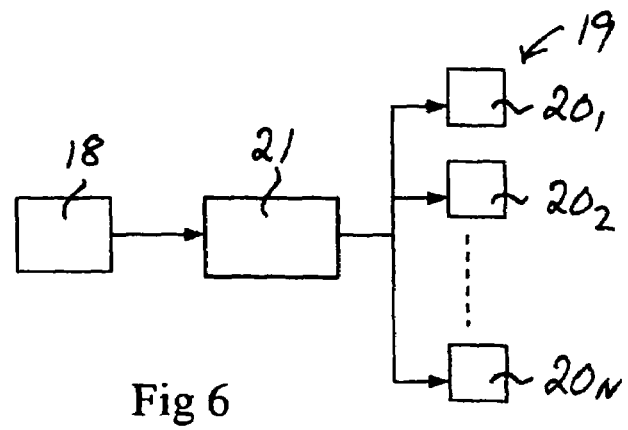
FIG. 6 is a block diagram illustrating an embodiment of a receiver unit included in a WDM system according to the present invention.

According to a first alternative, the receiver unit 19 comprises a radio receiver which is tunable so as to recover the management information signal from one wavelength converter 10a at a time, i.e. in this case the receiver unit 19 is tuned so as to sense the management information from one wavelength converter 10a at a time. This tunable radio receiver may e.g. be a radio receiver for digital signals. According to a second alternative, which is illustrated in FIG. 6, the receiver unit 19 comprises several radio receivers $20_1$, $20_2, \ldots 20_N$ connected in parallel, each radio receiver $20_1$, $20_2, \ldots 20_N$ being designed to recover the management information signal from one of the wavelength converters 10a, i.e. each wavelength converter 10a is associated with a specific one of radio receivers $20_1, 20_2, \ldots 20_N$. The radio receivers $20_1, 20_2, \ldots 20_N$ are preferably connected to the detector 18 via an amplifier 21, which is adapted to amplify the electrical signal from the detector.

Figure 7:
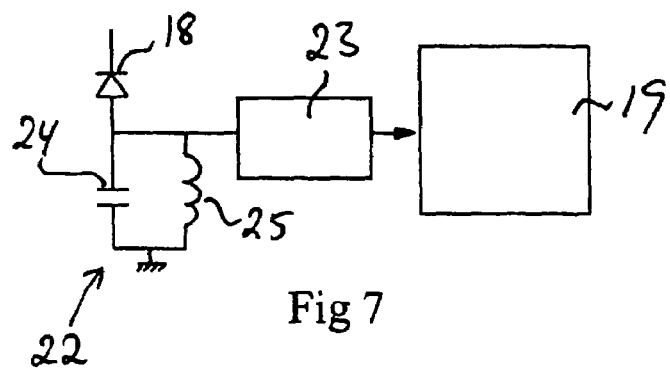
FIG. 7 is a block diagram illustrating another embodiment of a receiver unit included in a WDM system according to the present invention.

According to a preferred embodiment, which is illustrated in FIG. 7, a parallel resonance circuit 22 and a buffer amplifier 23 are connected in series between the detector 18 and the receiver unit 19. This will improve the signal-to-noise ratio of the electrical signal supplied by the detector 18 to the receiver unit 19. The resonance frequency and Q-value of the parallel resonance circuit 22 should be chosen so as to give a high impedance in the frequency range of the management information signals. The parallel resonance circuit 22 may consist of a capacitor 24 and an inductor 25 connected in parallel with each other. Resistors might be added to the parallel resonance circuit 22 in order to reduce the Q-value. The internal capacitance of the detector 18 could render the capacitor 24 superfluous.

The WDM system illustrated in FIG. 3 is designed for transmission of WDM signals in two directions, i.e. from the wavelength converters 10a of appliances A and B to the corresponding wavelength converters 10b of appliance C via a first optical transmission line 13a and in the opposite direction from the wavelength converters 10b of appliance C to the corresponding wavelength converters 10a of appliances A and B via a second optical transmission line 13b. Consequently, the respective wavelength converter 10a, 10b here comprises a transmitter for sending WDM signals as well as a receiver for receiving WDM signals. In this case, a tapping member 17, a detector 18 and a receiver unit 19 of the above-mentioned type could also be arranged to tap a fraction of the common optical signal in the second optical transmission line 13b and recover management information signals superimposed on the WDM signals from the wavelength converters 10b of the appliance C. These management information signals could then be transmitted to the above-mentioned central management unit 16.

The wavelength converters 10a, 10b may in addition to means for sending management information signals superimposed on the WDM signals be provided with an I2C interface for transmission of management information signals to a local management unit 15 of the respective appliance A, B, C in the conventional manner.

According to a preferred embodiment of the invention, the WDM system comprises wavelength converters 10a, 10b of pluggable type. Preferably, each wavelength converter 10a, 10b that is designed to superimpose a management information signal on the WDM signal is of pluggable type. The pluggable wavelength converters 10a, 10b could e.g. be of the GBIC or SFP type.

Figure 8:
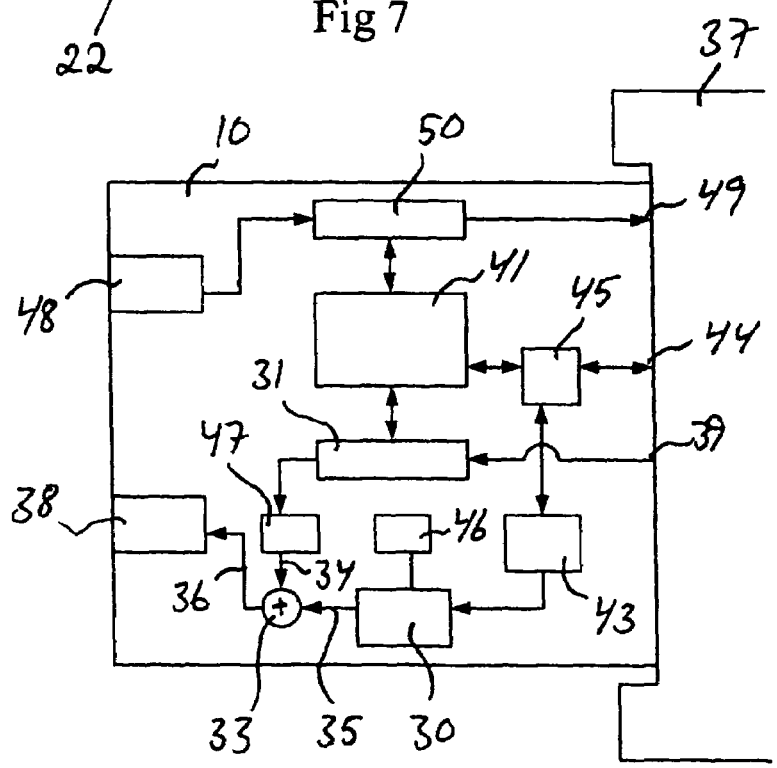
FIG. 8 is a block diagram illustrating an embodiment of a pluggable WDM wavelength converter according to the present invention.

An embodiment of a pluggable WDM wavelength converter according to the present invention is illustrated in FIG. 8. The pluggable wavelength converter 10 is provided with connectors, not shown, for removable connection of the wavelength converter 10 to a source unit 37. The pluggable wavelength converter 10 comprises a transmitter 38, often referred to as a TOSA (Transmitter Optical Subassembly), which comprises a light source, preferably in the form of a laser, for sending a WDM signal of a specific wavelength. The transmitter 38 sends a WDM signal based on a control signal received from a drive circuit 31, e.g. in the form of a laser-drive circuit. The drive circuit 31 is connected to an electrical interface 39 of the pluggable wavelength converter 10. Through this interface 39, an electrical high speed data signal is conveyed from the associated source unit 37 to said drive circuit 31. Furthermore, the pluggable wavelength converter 10 comprises a control circuit 41 adapted to generate management information, and a modulator 30, e.g. in the form of a narrow band ASK or FSK modulator, connected to the control circuit 41 for modulating a management information signal onto a carrier based on said management information. The modulated carrier is then superimposed on the WDM signal. In the illustrated embodiment, the pluggable wavelength converter 10 comprises a microcontroller 43 connected between the control circuit 41 and the modulator 30. This microcontroller 43 is adapted to control the modulator 30 based on the management information generated by the control circuit 41. The control circuit 41 could be adapted to convey management information to the associated source unit 37 via an interface 44, e.g. in the form of an I2C interface, which is a standardized interface that sends information regarding e.g. optical input power level, optical output power level, laser bias current, temperature and supply voltage. The microcontroller 43 could be connected directly to the control circuit 41, but is suitably connected to the control circuit 41 via an intermediate circuit 45 connected between the control circuit 41 and the interface 44 in order to "mirror" the signals between the control circuit 41 and the interface 44. A narrow band signal from the modulator 30 is added to the drive signal from the drive circuit 31, and the combined signal is supplied as a drive signal to the light source of the transmitter 38. If the outputs from the modulator 30 and the drive circuit 31 are electrical current signals, the adding member 33 could be constituted by a simple connection member for the electrical lines 34, 35, 36 which connect the drive circuit 31, the modulator 30 and the transmitter 38 to the adding member 33.

The pluggable wavelength converter 10 comprises a carrier generator 46, e.g. in the form of a frequency synthesizer, which is connected to the modulator 30 in order to generate a carrier of a predetermined carrier frequency for the management information signal.

A notch filter 47 for blocking or attenuating the frequency range in the WDM signal corresponding to the frequency range of the signal from the modulator 30 is preferably provided between the drive circuit 31 and the adding member 33, as illustrated in FIG. 8.

A pluggable wavelength converter 10 according to the invention could be designed to only send WDM signals and, consequently, lack means for receiving WDM signals. However, the pluggable wavelength converter 10 is preferably designed as a transceiver, i.e. provided with means for sending as well as receiving WDM signals. In the embodiment illustrated in FIG. 8, the pluggable wavelength converter 10 comprises a receiver 48, often referred to as a ROSA (Receiver Optical Subassembly), which comprises a detector, preferably in the form of a photodiode followed by a preamplifier, for receiving a WDM signal. The receiver 48 converts a received WDM signal to an electrical signal of a type that can be processed by the associated source unit 37. The receiver 48 communicates with the source unit 37 via an interface 49. An amplifier 50, e.g. in the form of a limiting amplifier, is connected between the receiver 48 and said interface 49 in order to amplify the output signals from the receiver 48. The amplifier 50 may also be connected to the control circuit 41.

The pluggable wavelength converter 10 could also be provided with a CDR (Clock and Data Recovery) at the output of the amplifier 50.

In the above-described embodiment, the control circuit 41 is responsible for collecting the desired management information. However, also the microcontroller 43 might be designed to collect such information.

The invention is of course not in any way restricted to the preferred embodiments described above, on the contrary many possibilities to modifications thereof should be apparent to a person skilled in the art without departing from the basic idea of the invention as defined in the appended claims. The invention is e.g. also applicable in a WDM system where only one optical fiber is used for transmitting common optical signals in both directions.

The invention claimed is:

1. A method for conveying management information in a WDM system from a number of wavelength converters to a central management unit, wherein a management information signal is superimposed on the individual WDM signal from the respective wavelength converter, wherein:
    the management information signals of the different wavelength converters are superimposed on the respective individual WDM signal in a mutually distinguishable manner;
    the individual WDM signals from the wavelength converters and the associated management information signals are combined and transmitted as a common optical signal on an optical transmission line;
    a fraction of the common optical signal is tapped off and directed to a detector, which converts the received fraction of the common optical signal into an electrical signal;
    the electrical signal from the detector is directed to a receiver unit, which recovers the different management information signals from the received electrical signal; and
    the recovered management information signals are transmitted from the receiver unit to the central management unit.

2. A method according to claim 1, wherein the wavelength converters send the management information signals repeatedly.

3. A method according to claim 1, wherein the management information signals of the different wavelength converters are modulated onto carriers of mutually different carrier frequencies, each wavelength converter being associated with a specific carrier frequency.

4. A method according to claim 3, wherein the frequency range for the carriers is located above 1 GHz, preferably in the range of 2.3-2.7 GHz.

5. A method according to claim 3, wherein the management information signals are modulated onto the carriers by digital amplitude modulation, preferably ASK modulation, or digital frequency modulation, preferably FSK modulation.

6. A method according to claim 1, wherein the individual WDM signals and the associated management information signals are generated in wavelength converters of pluggable type.

7. A method according to claim 1, wherein the frequency range in the respective individual WDM signal corresponding to the frequency range of the associated management information carrier is blocked or attenuated before the management information carrier is superimposed thereon.

8. A WDM system comprising a number of wavelength converters adapted to send individual WDM signals with management information signals superimposed thereon and means for combining the individual WDM signals from the wavelength converters and the associated management information signals for further transmission as a common optical signal on an optical transmission line, wherein the different wavelength converters are adapted to superimpose the management information signals on the respective individual WDM signal in a mutually distinguishable manner, and that the system further comprises:
    a tapping member for tapping a fraction of the common optical signal;
    a detector connected to the tapping member for converting said fraction of the common optical signal into an electrical signal;
    a receiver unit connected to the detector for recovering the different management information signals from the electrical signal of the detector; and
    a central management unit connected to the receiver unit for receiving and processing the management information signals.

9. A WDM system according to claim 8, wherein the wavelength converters are adapted to send the management information signals repeatedly.

10. A WDM system according to claim 8, wherein the different wavelength converters are adapted to modulate the management information signals onto carriers of mutually different carrier frequencies, each wavelength converter being associated with a specific carrier frequency.

11. A WDM system according to claim 10, wherein the frequency range for the carriers is located above 1 GHz, preferably in the range of 2.3-2.7 GHz.

12. A WDM system according to claim 10, wherein the wavelength converters are adapted to modulate the management information signals onto the carriers by digital amplitude modulation, preferably ASK modulation, or digital frequency modulation, preferably FSK modulation.

13. A WDM system according to claim 8, wherein the system comprises wavelength converters of pluggable type.

14. A WDM system according to claim 8, wherein the detector is a photodiode.

15. A WDM system according to claim 8, wherein the respective wavelength converter is provided with means for blocking or attenuating the frequency range in the WDM signal corresponding to the frequency range of the associated management information carrier.

16. A WDM system according to claim 8, wherein the receiver unit comprises a radio receiver which is tunable so as to recover the management information signal from one wavelength converter at a time.

17. A WDM system according to claim 8, wherein the receiver unit comprises several radio receivers connected in parallel, each radio receiver being designed to recover the management information signal from one of the wavelength converters.

18. A WDM system according to claim 8, wherein a parallel resonance circuit and a buffer amplifier are connected in series between the detector and the receiver unit.

19. A pluggable WDM wavelength converter for converting an electrical or optical signal into an individual WDM signal, wherein the pluggable wavelength converter comprises a modulator for modulating a management information signal onto a carrier and means for superimposing the modulated carrier on the individual WDM signal; wherein:

the pluggable wavelength converter comprises a control circuit adapted to generate management information, and the modulator is adapted to modulate the management information signal on the carrier based on the management information generated by the control circuit; and the pluggable wavelength converter comprises a microcontroller, which is adapted to control the modulator based on the management information generated by the control circuit.

20. A pluggable WDM wavelength converter according to claim 19, wherein the pluggable wavelength converter comprises means, preferably a notch filter, for blocking or attenuating the frequency range in the individual WDM signal corresponding to the frequency range of the associated management information carrier.

21. A pluggable WDM wavelength converter according to claim 19, wherein the pluggable wavelength converter comprises a carrier generator, preferably in the form of a frequency controller, for allocating the management information signal a carrier of a predetermined carrier frequency.

* * * * *